Patented Dec. 14, 1948

2,456,576

UNITED STATES PATENT OFFICE 2,456,576

PROCESS OF STABILIZING TREATMENT OF INORGANIC OXIDE GELS AGAINST WETTING

Ernest A. Bodkin, Mickleton, and John W. Payne, Woodbury, N. J., assignors to Socony-Vacuum Oil Company, Incorporated, a corporation of New York No Drawing. Application October 16, 1945, Serial No. 622,680

8 Claims. (Cl. 252—254)

This invention relates to a method for stabilizing dry inorganic oxide hydrogels when the same are brought into contact with aqueous liquids. More particularly, the invention relates to a novel process in which the shattering of dry gels upon wetting is overcome by treatment with a normally gaseous water-soluble material prior to subjection of the gel to an aqueous wetting liquid.

The high affinity of inorganic oxide gels for various fluids has long been recognized and this characteristic has in fact led to one of the principal uses of such gels, namely, as adsorbents. However, when the dry gels are immersed in water or water containing solutions hereinafter referred to as aqueous wetting liquids, the gel particles tend to disrupt with violence, yielding a mass of small shattered fragments.

In certain operations employing gels, it is oftentimes expedient to immerse the dry gel in aqueous liquids without causing a shattering of the same into small fragments. For example, in the use of gel particles in various adsorbent processes or in catalytic reactions promoting the conversion of hydrocarbons, it is sometimes necessary to wet the dry gel particles without substantially modifying the shape or size of such particles, such as is caused by shattering due to wetting. To take a specific example, inorganic oxide gel particles of spheroidal shape have the advantages of packing in a uniform manner in operations in which a contact bed is employed as in the catalytic cracking of heavy hydrocarbons to lighter material of the nature of gasoline. It is accordingly desirable to retain the spheroidal shape of the formed gel when the dry particles are subjected in various processing steps to aqueous wetting liquids. Likewise, in other processes dry gel particles of particular shape or even irregularly shaped fragments should suitably retain their original form when immersed in aqueous liquids which penetrate into the pores of the gel.

Attempts have been made in the past to overcome the difficulties arising by the shattering of dry gel particles when they are subjected to wetting. Some degree of success has been accomplished by placing the particles under a vacuum of less than 0.1 mm. of mercury and then immersing the particles into a desired aqueous liquid without a release of the vacuum. However, because of the high vacuum requirement this method has not been considered to be particularly satisfactory and even when conducted on a small scale it requires a relatively difficult operating technique.

In accordance with the present invention, a novel method of preventing the shattering of dry gels has been found. This method comprises treating the dry gel with a normally gaseous material which is soluble in the aqueous wetting liquid and then immediately immersing the gel in that liquid. In carrying out the wetting of dry gel particles by this method, shattering of the gel can be substantially reduced or, in some cases, entirely eliminated.

The following examples will serve to illustrate the invention:

Example I

A silica-alumina hydrosol was prepared by mixing 1.00 volume of a solution of sodium silicate containing 157.0 grams of $SiO_2$ per liter with 1.00 volume of a solution containing 39.79 grams of aluminum sulphate and 30.51 grams of sulphuric acid per liter. The resulting colloidal solution was ejected from a nozzle in the form of globules into a column of gas oil whose depth was eight feet. The globules of solution fell through the oil and gelled before passing into a layer of water located beneath the oil. The time of gelation for the concentrations and proportions of reactants given above was about four seconds. The spherical particles of gel were conducted out of the bottom of the column into a stream of water and, on removal from the water, base exchanged with aqueous solution of aluminum sulphate and water washed. The pellets were then slowly and uniformly dried in superheated steam at about 300° F. until shrinkage was substantially complete and the drying was continued at a gradually increasing temperature up to 1300° F., at which temperature it was maintained for ten hours. The silica-alumina gel retained its spheroidal shape during the washing and drying operations.

A sample of 25 cc. of the dry spheroidal gel pellets was exposed to a stream of carbon dioxide fed at a gauge pressure of about one pound per square inch for a period of one hour. After this gas treatment, the pellets were brought into contact with water and completely soaked. They were then dried in a superheated steam atmosphere at a temperature of about 250° F. and then cooled to room temperature. The yield of unbroken pellets was 100%.

A second sample of 25 cc. of the dry spheroidal gel pellets was soaked in water, subsequently dried and cooled as above. The pellets were completely broken in this instance, indicating that the pretreatment of the dry gel particles with carbon dioxide has eliminated shattering of the gel upon wetting.

Example II

A sample of 25 cc. of the dry gel pellets prepared according to Example I was exposed to a stream of ammonia gas fed at a gauge pressure of about one-quarter pound per square inch for a period of one hour. After this gas treatment, water was admitted and the treated pellets were completely soaked. They were subsequently dried in a superheated steam atmosphere at a temperature of about 250° F. and then cooled to room temperature. The yield of unbroken pellets was 93% as compared with a figure of 0% for a blank run in which gas treatment was omitted.

From the above examples, it will be apparent to those skilled in the art that by treating the dry gel with a gas having a high solubility in water, disruption of the gel particles caused by wetting has been overcome. Thus, if it desired to wet a dry gel with an aqueous liquid such as water or dilute aqueous solutions, suitable displacing gases include carbon dioxide, ammonia, chlorine, hydrogen chloride, sulfur dioxide, hydrogen sulfide and other water soluble gases. The present invention is thus confined to treatment of the dry gel prior to wetting with materials which are naturally gaseous and which are soluble in the aqueous liquid employed.

While the invention has been illustrated with spheroidal pellets of silica-alumina gel, other dry inorganic oxide gels of any specified shape may be treated by the process described above to render them stable when they are subjected to a wetting liquid. Thus, the present invention contemplates the stabilization against disruption upon wetting of dry gels of silica, silica-stannic oxide, silica-ceria, silica-thoria, silica-alumina-thoria, silica-alumina-stannic oxide, silica-alumina-ceria, and the like.

The time of gas treatment and the gauge pressure shown in the above examples are not critical, it being only necessary that the treated gel be exposed to an atmosphere of the water-soluble gas used for a sufficient period of time and under a sufficient pressure to become substantially saturated. The gel particles should be brought into contact with the aqueous wetting liquid immediately after the gas treatment to insure the optimum results of this invention. That is, to obtain a minimum breakage of gel particles they should be immersed in aqueous liquid before the treating gas diffuses from the gel pores.

According to the most widely accepted theory of gel structure, the water normally present in the freshly formed gel is held by capillary action. As the gel dries, the water in the capillary gel structure is replaced by air. While the present invention is of course not limited by any theory it is believed that the disruption of the dry gel particles upon wetting with an aqueous liquid is due to the compresssion of the air in the gel pores by the rapid infiltration of aqueous liquid to increase the internal pressure to such a point that the gel particle flies apart in a violent manner. When the air normally present is replaced as in the instant invention with a water soluble gas, disruption of the gel does not occur since the aqueous liquid which enters the gel pores dissolves the water soluble gas therein. Thus, it is thought that there is substantially no internal pressure developed and hence no disruption of the gel.

It is to be clearly understood that the above described gas treatment and subsequent wetting with aqueous liquid applies to the dry formed gel and does not include any gas treatment involved in the preparation of such gels, or in the treatment of wet or partially processed moist gels.

We claim:

1. A method of stabilizing a dry inorganic oxide gel against disruption upon wetting with an aqueous liquid, comprising effecting a substantial saturation of the gel under ordinary temperature conditions with a water-soluble, non-aqueous, normally gaseous material which is chemically inert toward said aqueous liquid and maintaining said substantial saturation of the gel until contact thereof with said aqueous liquid.

2. A method of stabilizing a dry inorganic oxide gel against disruption upon wetting with water, comprising effecting a substantial saturation of the gel under ordinary temperature conditions with a water-soluble, non-aqueous, normally gaseous material and maintaining said substantial saturation of the gel until contact thereof with water.

3. A method of stabilizing a dry inorganic oxide gel against disruption upon wetting with an aqueous liquid, comprising effecting a substantial saturation of the gel under ordinary temperature conditions with gaseous carbon dioxide, said gas being chemically inert toward said aqueous liquid and maintaining said substantial saturation of the gel until contact thereof with said aqueous liquid.

4. A method of stabilizing a dry inorganic oxide gel against disruption upon wetting with an aqueous liquid, comprising effecting a substantial saturation of the gel under ordinary temperature conditions with gaseous ammonia, said gas being chemically inert toward said aqueous liquid and maintaining said substantial saturation of the gel until contact thereof with said aqueous liquid.

5. A method of stabilizing a dry inorganic oxide gel against disruption upon wetting with an aqueous liquid, comprising effecting a substantial saturation of the gel under ordinary temperature conditions with gaseous chlorine, said gas being chemically inert toward said aqueous liquid and maintaining said substantial saturation of the gel until contact thereof with said aqueous liquid.

6. A method of stabilizing a dry siliceous gel against disruption upon wetting with an aqueous liquid, comprising effecting a substantial saturation of the gel under ordinary temperature conditions with a water-soluble, non-aqueous, normally gaseous material which is chemically inert toward said aqueous liquid and maintaining said substantial saturation of the gel until contact thereof with said aqueous liquid.

7. A method of stabilizing a dry silica-alumina gel against disruption upon wetting with an aqueous liquid, comprising effecting a substantial saturation of the gel under ordinary temperature conditions with a water-soluble, non-aqueous, normally gaseous material which is chemically inert toward said aqueous liquid and maintaining said substantial saturation of the gel until contact thereof with said aqueous liquid.

8. A method of stabilizing dry spheroidal particles of an inorganic oxide gel against disruption upon wetting with an aqueous liquid, comprising effecting a substantial saturation of the gel under ordinary temperature conditions with a water-soluble, non-aqueous, normally gaseous material which is chemically inert toward said aqueous liquid and maintaining said substantial saturation of the gel until contact thereof with said aqueous liquid.

ERNEST A. BODKIN.
JOHN W. PAYNE.

REFERENCES CITED

The following references are of record in the file of this patent:

UNITED STATES PATENTS

| Number | Name | Date |
|---|---|---|
| 1,547,236 | Reyerson | July 28, 1925 |
| 1,798,766 | Stoewener | Mar. 31, 1931 |
| 1,935,178 | Connolly | Nov. 14, 1933 |
| 2,005,412 | Connolly | June 18, 1935 |
| 2,324,518 | Klein et al. | July 20, 1943 |

FOREIGN PATENTS

| Number | Country | Date |
|---|---|---|
| 212,035 | Great Britain | Mar. 6, 1924 |
| 271,564 | Great Britain | May 25, 1927 |

Certificate of Correction

Patent No. 2,456,576.  December 14, 1948.

ERNEST A. BODKIN ET AL.

It is hereby certified that errors appear in the above numbered patent requiring correction as follows:

In the grant, line 6, and in the heading to the printed specification, lines 2 and 3, title of invention, strike out "TREATMENT OF"; column 3, line 19, after "if it" insert *is*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*